United States Patent
Barsness et al.

(10) Patent No.: US 9,325,742 B1
(45) Date of Patent: Apr. 26, 2016

(54) ADDING AN ENCRYPTION POLICY IN A STREAMING ENVIRONMENT

(71) Applicant: International Business Machines Corporation, Armonk, NY (US)

(72) Inventors: Eric L. Barsness, Pine Island, MN (US); Michael J. Branson, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/947,024

(22) Filed: Nov. 20, 2015

(51) Int. Cl.
*H04L 29/06* (2006.01)
*G06F 17/30* (2006.01)

(52) U.S. Cl.
CPC .......... *H04L 63/20* (2013.01); *G06F 17/30563* (2013.01); *G06F 17/30958* (2013.01); *H04L 63/0428* (2013.01); *H04L 63/10* (2013.01)

(58) Field of Classification Search
CPC ....................................................... H04L 9/00
See application file for complete search history.

(56) References Cited

U.S. PATENT DOCUMENTS

| | | |
|---|---|---|
| 8,811,611 B2 | 8/2014 | Teerlink |
| 8,954,723 B2 | 2/2015 | Branson et al. |
| 8,959,579 B2 | 2/2015 | Barton et al. |
| 2009/0055417 A1* | 2/2009 | Hannuksela ...... G06F 17/30858 |
| 2013/0305034 A1* | 11/2013 | Branson ..................... H04L 9/00 |
| | | 713/150 |
| 2015/0334155 A1* | 11/2015 | Bragstad ............. G06F 9/45533 |
| | | 709/219 |

OTHER PUBLICATIONS

Anonymous, "Security for Shared Data Spaces", ip.com, An IP.com Prior Art Database Technical Disclosure, 16 pages. IP.com No. 000156657. IP.com Electronic Publication: Jul. 30, 2007.
Liang et al., "Resource Allocation for Security Services in Mobile Cloud Computing", IEEE INFOCOM 2011 Workshop on M2MCN-2011, Copyright 2011 IEEE, pp: 191-195.
Yadav et al., "Identity Representation for RSVP (RFC2752)", ip.com, An IP.com Prior Art Database Technical Disclosure, Copyright The Internet Society 2000, 15 pages. Original Publication Date: Jan. 1, 2000 IP.com No. 000003349. IP.com Electronic Publication: Sep. 13, 2000.

* cited by examiner

*Primary Examiner* — Jason K Gee
(74) *Attorney, Agent, or Firm* — Joseph W. Cruz; Grant Johnson

(57) ABSTRACT

A plurality of processing elements may include a first processing element having a first stream operator configured to transmit at least a portion of the tuples to a second stream operator. A first rule of an encryption policy may be determined to require encrypting at least a first value of a first attribute. The first value may be within a first tuple of the portion of the tuples. Each tuple of the portion of the tuples may include the first attribute and a second attribute. A first connection may be established for transmitting from the first stream operator to the second stream operator. The first connection may be an encrypted connection. The first value may be extracted from the first tuple and transmitted to the second stream operator via the first connection. The first stream operator may perform the extracting and transmitting.

20 Claims, 6 Drawing Sheets

ADDING AN ENCRYPTION POLICY IN A STREAMING ENVIRONMENT

BACKGROUND

The present disclosure relates generally to the field of stream computing, and more particularly to computing applications that receive streaming data and process the data as it is received.

Database management systems are typically configured to separate the process of storing data from accessing, manipulating, or using data stored in a database. More specifically, database management systems use a model in which data is first stored and indexed in a memory before subsequent querying and analysis. In general, database management systems may not be well suited for performing real-time processing and analyzing streaming data. In particular, database systems may be unable to store, index, and analyze large amounts of streaming data efficiently or in real time.

SUMMARY

One or more embodiments are directed to a computer-implemented method, a system, and a computer program product for implementing an encryption policy in a stream computing environment. A stream of tuples to be processed by a plurality of processing elements operating on one or more computer processors may be received. Each processing element may have one or more stream operators. The plurality of processing elements may form an operator graph in which the tuples flow between the one or more stream operators. The operator graph may define one or more execution paths for processing and routing the stream of tuples. Each processing element may have an associated memory space. The plurality of processing elements may include a first processing element having a first stream operator configured to transmit at least a portion of the tuples to a second stream operator. A first rule of an encryption policy may be determined to require encrypting at least a first value of a first attribute. The first value may be within a first tuple of the portion of the tuples. Each tuple of the portion of the tuples may include the first attribute and a second attribute. A first connection may be established for transmitting from the first stream operator to the second stream operator. The first connection may be an encrypted connection. The first value may be extracted from the first tuple and transmitted to the second stream operator via the first connection. The first stream operator may perform the extracting and transmitting.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present invention and, along with the description, serve to explain the principles of the invention. The drawings are only illustrative of typical embodiments of the invention and do not limit the invention.

Figure 1:
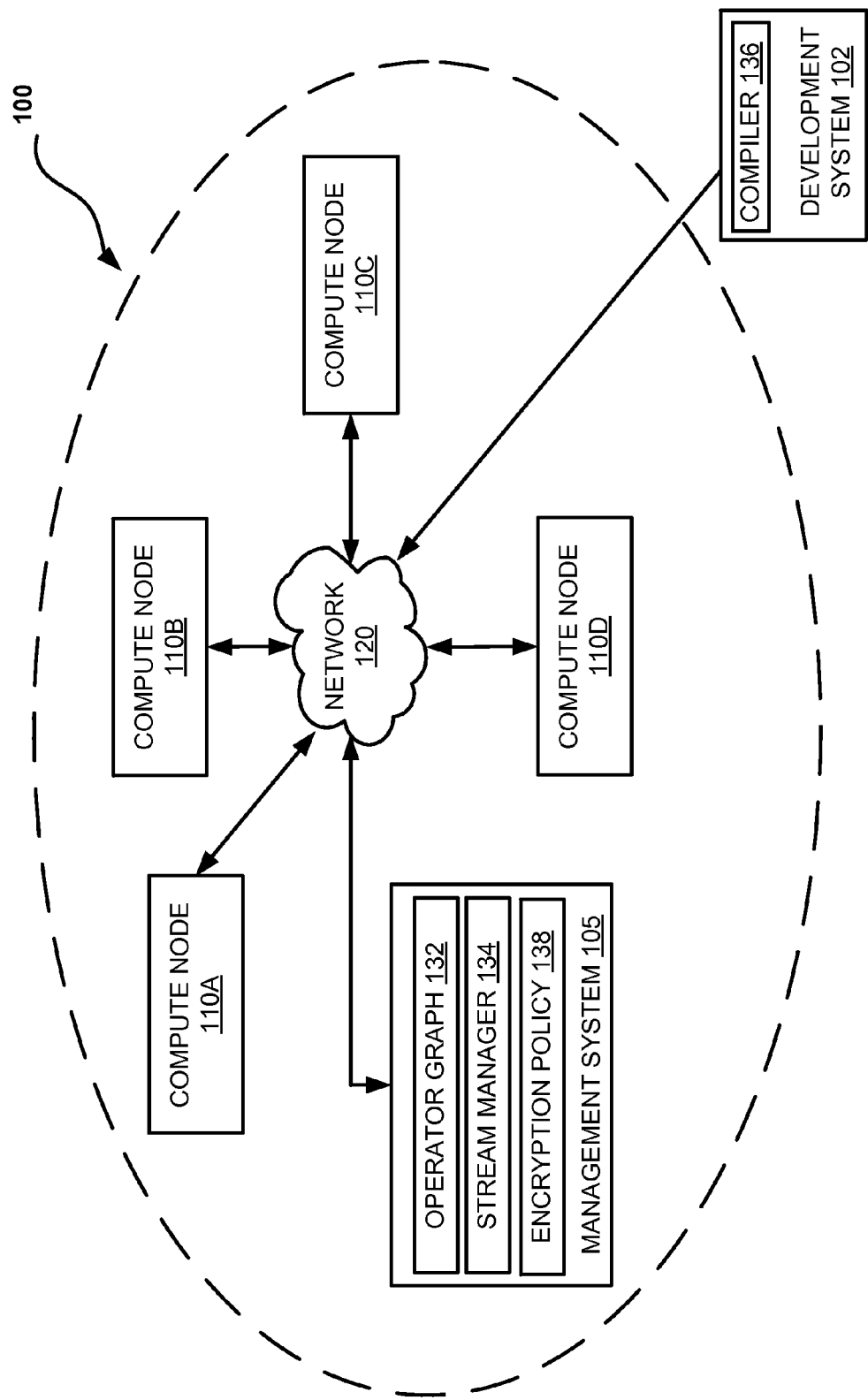
FIG. 1 illustrates a stream computing infrastructure configured to execute a stream computing application, according to various embodiments.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to stream computing. In embodiments, more particular aspects relate to configuring an encryption policy in a stream computing environment. While the present disclosure is not necessarily limited to such applications, various aspects of the disclosure may be appreciated through a discussion of various examples using this context.

Stream-based computing and stream-based database computing are emerging as a developing technology for a variety of applications. For example, products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple (further defined herein) by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using some interprocess communication techniques. Further, processing elements can be inserted or removed dynamically from an operator graph representing the flow of data through the stream computing application. A particular stream operator may not reside within the same operating system process as other stream operators. Stream operators in the same operator graph may be hosted on different nodes, e.g., on different compute nodes or on different cores of a compute node.

Data flows from one stream operator to another in the form of a "tuple." A tuple is a sequence or row of one or more attribute values associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may process a received tuple within fractions of a second. Unless the stream operators are located in the same processing element, an inter-process communication path can be used each time a tuple is sent from one stream operator to another. Inter-process communication paths can be a resource in a stream computing application. According to various embodiments, the available bandwidth on one or more inter-process communication paths may be conserved. Efficient use of inter-process communication bandwidth can speed up processing.

An operator graph can be an execution path for a plurality of stream operators to process a stream of tuples. In addition to stream operators, the operator graph can refer to an execution path for processing elements and the dependent stream operators of the processing elements to process the stream of tuples. Generally, the operator graph can have a plurality of stream operators that produce a particular end result, e.g., calculate an average. An operator graph may be a linear arrangement of processing elements and/or operators, or it may include one or more distinct execution paths, also known as sub-processes, methods, or branches.

In a stream computing environment, users may be incentivized to provide security for streaming data that is transmitted between two or more stream operators regardless of whether the two or more stream operators are located on the same compute node, different compute nodes, and/or on different server computing devices. Users may particularly desire only to provide security for specific tuples, specific attributes of tuples, or a specific value of a particular tuple, as opposed to an entire stream of tuples. For example, a business may employ an application that tracks real-time sales information. The business may wish to initiate an encryption policy that includes a rule to only encrypt information specifying the name of a product that was involved in a sales transaction (e.g., because the business may not wish to share which product is making sales for competitive reasons). However, the same encryption policy may specify to not encrypt the information specifying sales amount in dollars, information specifying the time of the sale, information specifying the date of the sale, etc. because this information may not be as proprietary. Therefore, embodiments of the present disclosure are directed to establishing an encryption policy to encrypt at least a portion of tuples and process the tuples based on the encryption policy.

FIG. 1 illustrates one exemplary stream computing infrastructure 100 that may be configured to execute a stream computing application, according to some embodiments. The stream computing infrastructure 100 includes a management system 105 and two or more compute nodes 110A-110D— i.e., hosts—which are communicatively coupled to each other using one or more communications networks 120. The management system 105 can include an operator graph 132, a stream manager 134, and an encryption policy 138, discussed further in FIG. 3. The communications network 120 may include one or more servers, networks, or databases, and may use a particular communication protocol to transfer data between the compute nodes 110A-110D. A development system 102 may be communicatively coupled with the management system 105 and the compute nodes 110 either directly or via the communications network 120. In some embodiments, the stream computing infrastructure 100 is an entirely server-side environment for processing and analyzing tuples (e.g., a data stream management system). Therefore, for example, client devices (e.g., mobile phones) in some embodiments may not affect or perform any of the processes as described herein. Accordingly, two or more operators that are processing tuples may be included within the same server system and not within any client devices.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware and software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
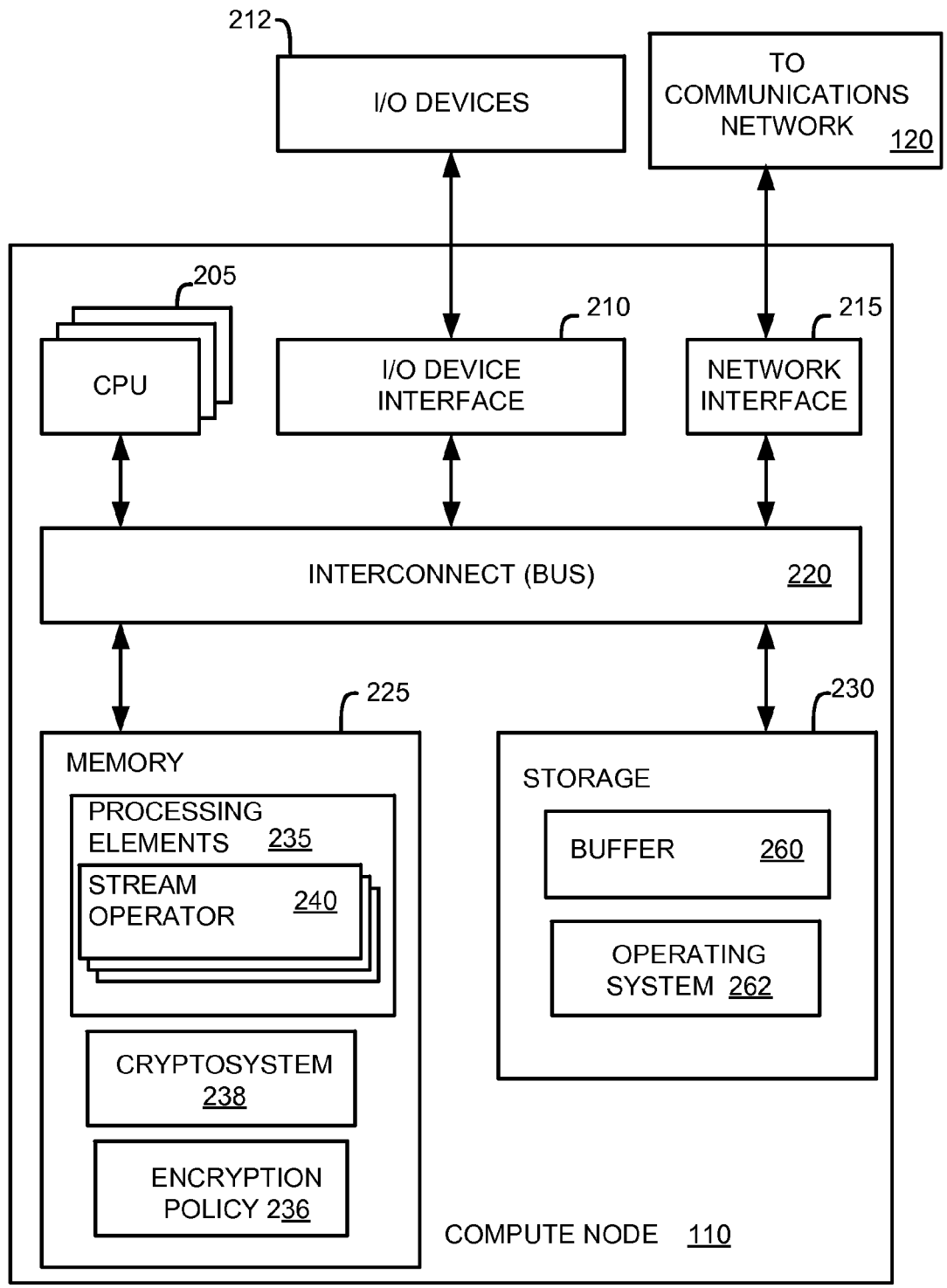
FIG. 2 illustrates a more detailed view of a compute node of FIG. 1, according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110. In some embodiments, each of the compute nodes 110 represents a particular compute instance of a single computing device (e.g., computing components within a chassis, a blade within a blade server, an I/O drawer, a processor chip, etc.). For example, compute node 110A may correspond to a first chassis within a first computing device and compute node 110B may correspond to a second chassis within the first computing device. Alternatively, each of the compute nodes 110 may represent an entire computing device that includes one or more processors and one or more associated memory devices. For example, compute node 110A may be a first server computing device host and compute node 110B may be a second server computing device host.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. Two or more processing elements 235 may run on the same memory 225, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

The stream computing application may also include an encryption policy 236 and a cryptosystem 238. An encryption policy as described herein is a policy or rule(s) (defined by a user or computing system) that defines what, how and/or when particular tuples or portions (e.g., attributes, values, etc.) of tuples will be encrypted. The encryption policy 236 is described in more detail below. The cryptosystem 238 is a system for providing encryption for the tuples. For example, the cryptosystem 238 may include a keying system for the managing and/or storing of various keys for encrypting and/or decrypting tuples (e.g., public and private keys) and an encryption engine for encrypting tuples according to a particular ciphertext algorithm (e.g., symmetric encryption). The cryptosystem 238 is described in more detail below.

Figure 3:
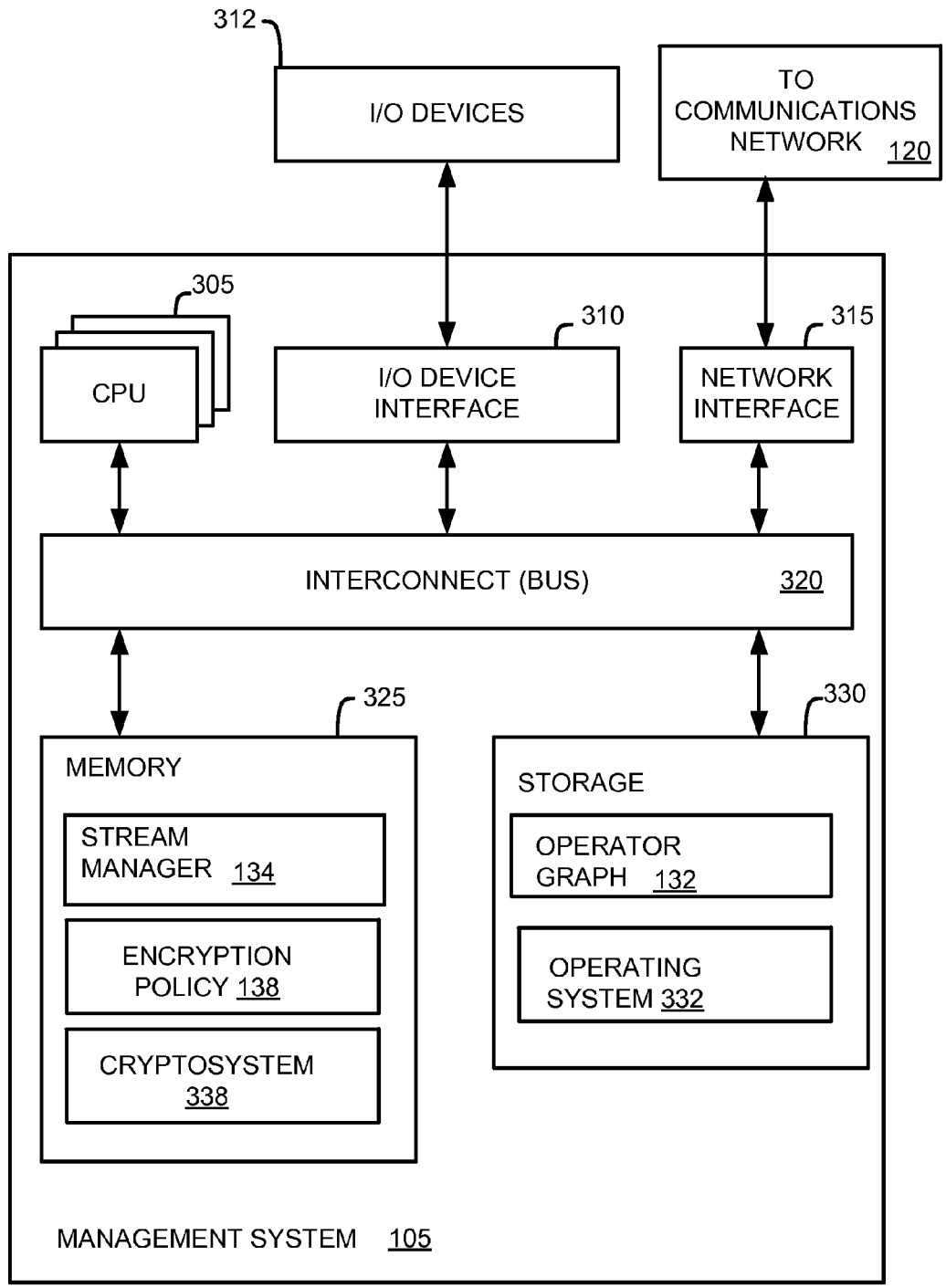
FIG. 3 illustrates a more detailed view of the management system of FIG. 1, according to various embodiments.

FIG. 3 is a more detailed view of the management system 105 of FIG. 1 according to some embodiments. The management system 105 may be a computing device and include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134, the encryption policy 138, and a cryptosystem 338. Additionally, the storage 330 may store an operator graph 132, and the operating system 332. In some embodiments, the storage 330 may also store the encryption policy 138 and the cryptosystem 338. The operator graph 132 may define how tuples are routed to processing elements 235 (FIG. 2) for processing. In certain embodiments, as illustrated in FIGS. 2 and 3, a cryptosystem may be stored to all of the compute nodes 110A, 110B, 110C, and 110D, and the management system 105. This may be for encryption and decryption purposes between two or more compute nodes. For example, a first compute node may store a private key to encrypt a first set (i.e. one or more) of tuples before the first compute node sends the first set of tuples to a second compute node. The second compute node may store the first compute node's public key but also its own private key to decrypt the first set of tuples. Moreover, as illustrated in FIGS. 2 and 3, the same encryption policy 138 may be stored to both the compute node 110 and the management system 105. And the same encryption policy 138 may be stored to multiple compute nodes. This may be for use, for example, in determining what particular portions of a tuple a transmitting or receiving stream operator may encrypt or decrypt respectively. For example, according to an encryption policy, a first stream operator may only encrypt a first attribute of a tuple. In order for the second stream operator to know that only the first attribute should be encrypted (e.g., what to decrypt), the second stream operator may have to be aware of the particular encryption policy.

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
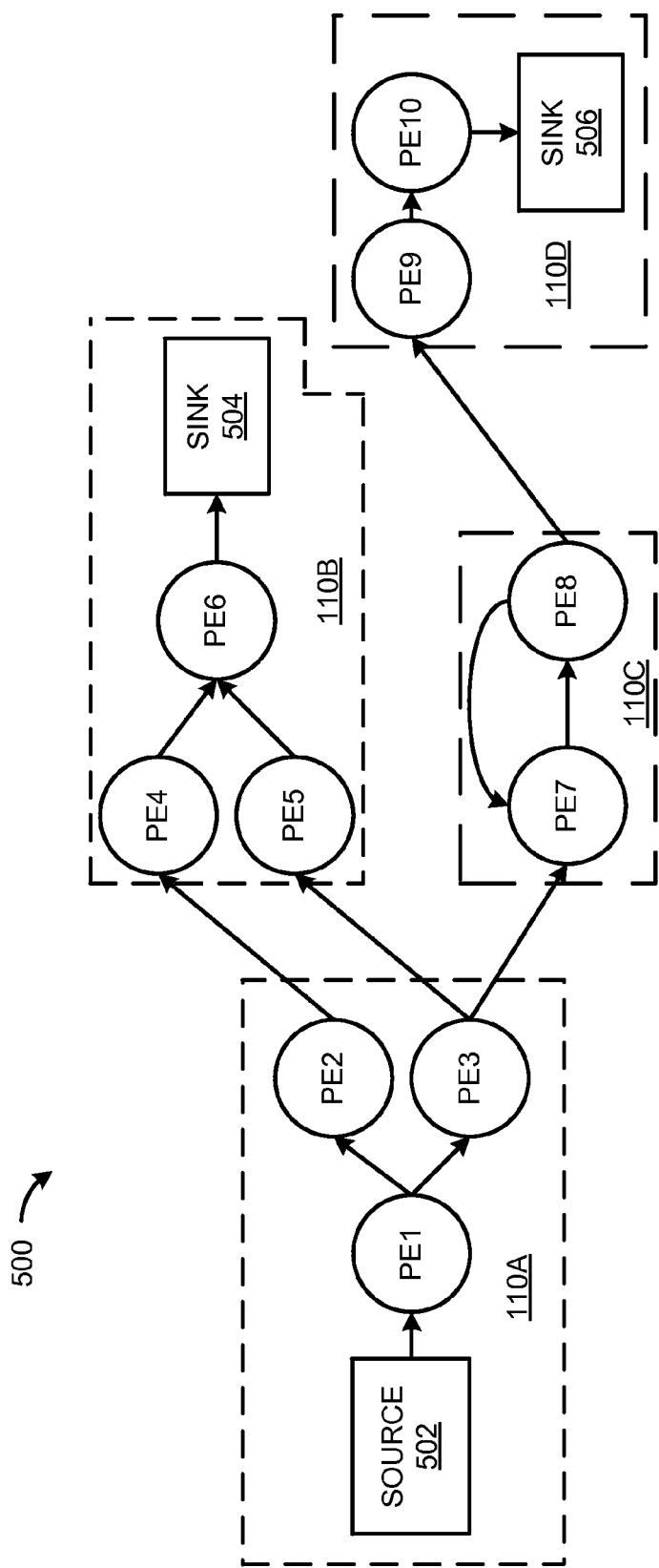
FIG. 4 illustrates an operator graph for a stream computing application, according to various embodiments.

FIG. 4 illustrates an exemplary operator graph 500 for a stream computing application beginning from one or more sources 502 through to one or more sinks 504, 506, according to some embodiments. This flow from source to sink may also be generally referred to herein as an execution path. In addition, a flow from one processing element to another may be referred to as an execution path in various contexts. Although FIG. 4 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 4 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 502 and ends at a sink 504, 506. Compute node 110A includes the processing elements PE1, PE2, and PE3. Source 502 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to PE6 before being transmitted to a sink 504. Similarly, tuples flowing from PE3 to PE5 also reach PE6 and are sent to a sink 504. Thus, PE6 could be configured to perform a join operation, combining tuples received from PE4 and PE5, before sending the data to the sink 504. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in PE10 before being sent to a sink 506.

The tuple received by a particular processing element 235 (FIG. 2) is generally not considered to be the same tuple that is output downstream. Typically, the output tuple is changed in some way. An attribute or metadata may be added, deleted, or changed. However, it is not required that the output tuple be changed in some way. Generally, a particular tuple output by a processing element may not be considered to be the same tuple as a corresponding input tuple even if the input tuple is not changed by the processing element. However, to simplify the present description and the claims, an output tuple that has the same data attributes as a corresponding input tuple may be referred to herein as the same tuple.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, change the deployment of an operator graph, e.g., operator graph 132. The stream manager 134 may move processing elements from one compute node 110 to another, for example, to manage the processing loads of the compute nodes 110A-110D in the stream computing infrastructure 100. Further, stream manager 134 may control the stream computing application by inserting, removing, fusing, un-fusing, or otherwise modifying the processing elements and stream operators (or what tuples flow to the processing elements) on the compute nodes 110A-110D.

Because a processing element may be a collection of fused stream operators, it is equally correct to describe the operator graph as one or more execution paths between specific stream operators, which may include execution paths to different stream operators within the same processing element. FIG. 4 illustrates execution paths between processing elements for the sake of clarity. As discussed in more detail below, the operator graph 500 in FIG. 4 may represent the flow of tuples between stream operators according to an encryption policy.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

Figure 5:
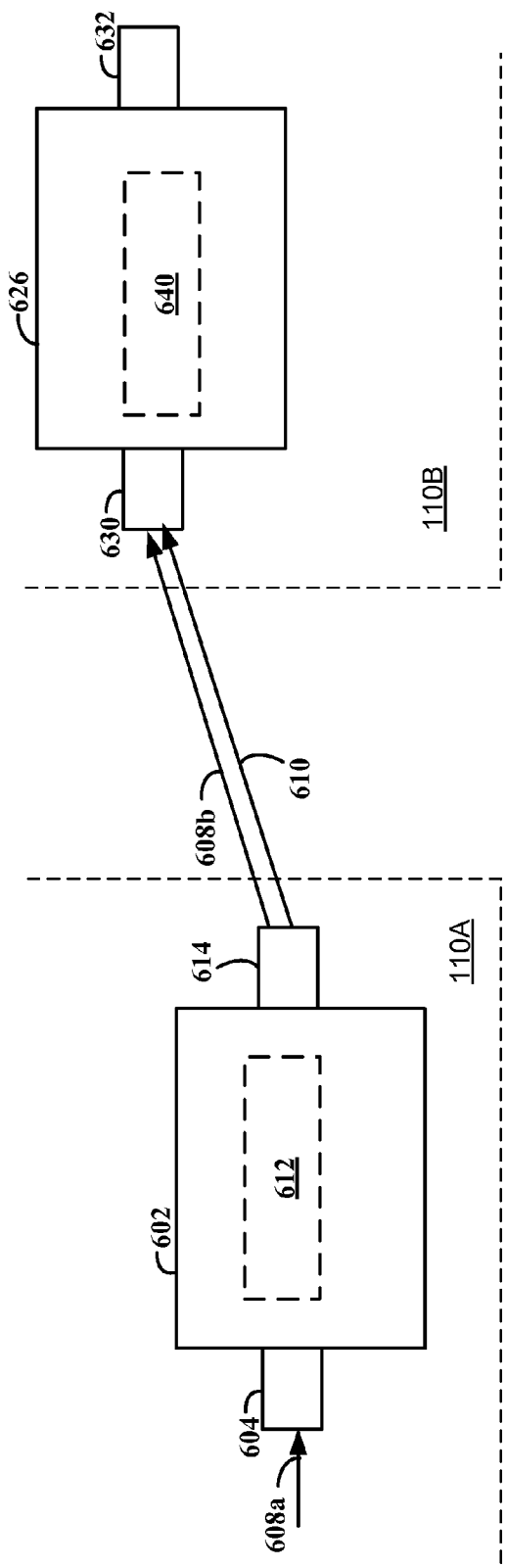
FIG. 5A illustrates a more detailed view of the communication between processing elements PE2 and PE4 on compute nodes 110A and 110B respectively of FIG. 4, according to various embodiments.
FIG. 5B illustrates a table 616, which may correspond to the stream of tuples as they appear as soon as they are received and assembled by the processing element PE4 from processing element PE2, according to embodiments.

FIG. 5A illustrates a more detailed view of the communication between processing elements PE2 and PE4 on compute nodes 110A and 110B respectively of FIG. 4, according to various embodiments. The processing element PE2 includes a stream operator 602 with input port 604 for receiving a first stream (or portion of a stream) of tuples corresponding to a non-encrypted connection 608a. The stream operator 602 may include a first window 612. The stream operator 602 may also include an output port 614 that outputs a first set of values of the tuples through the non-encrypted connection 608b to processing element PE4, which includes the stream operator 626. An encrypted connection 610 (e.g., SSL connection) may also be established between operators 602 and 626 such that a second set of encrypted values of the stream of tuples are transmitted from the output port 614 to the input port 630 of the stream operator 626, which may be located on compute node 110. The stream operator 626 may also include its own output port 632 and a second window 640. In some embodiments, as illustrated in FIG. 5A, both the non-encrypted connection 608b and the encrypted connection 610 may be implemented using the same ports (i.e., output port 614 and input port 620). Accordingly, the non-encrypted connection 608b and the encrypted connection 610 are not concurrent in that they are not established at a same time. Rather, the communication from the output port 614 and the input port 620 may switch back and forth between the encrypted connection 608b and the encrypted connection 610 according to the encryption policy, as described in more detail below. Alternatively, in some embodiments, the non-encrypted connection 608b may be established via a first set of ports and the encrypted connection 610 may be established via a second different set of ports such that the non-encrypted connection 608b and the encrypted connection 610 may be established at a same time or substantially the same time (i.e., in parallel).

According to the illustration of FIG. 5A, a first stream of tuples may be received at the input port 604 via the non-encrypted connection 608a. Consequently, in some embodiments, streams of tuples may not be encrypted for communication between processing elements or stream operators within the same compute node (e.g., compute node 110A). In other embodiments, however, streams of tuples may be encrypted for any communication between any two stream operators within the same node. Accordingly, in some embodiments, the connection 608a may be an encrypted connection that corresponds to a particular stream operator that transmits a stream of tuples to stream operator 602. It may be desirable to encrypt data between two stream operators within the same compute node because it may be possible for unauthorized access of data within the compute node. For example, a Transmission Control Protocol/Internet Protocol (TCP/IP) connection may be established between a first stream operator and a stream second operator within the same node, which is described in more detail below. Data packets that include the tuples to be transmitted may be transmitted through the TCP/IP stack or layers (e.g., application layer (e.g., Hypertext Transfer Protocol (HTTP)), a transport layer (e.g., TCP), a network layer (e.g., IP), and a network interface level). When tuple data is ready to be transmitted from the first stream operator to the second stream operator, the tuple data may be transmitted over a Network Interface Card (NIC). Accordingly, when the tuple data is transmitted from the first stream operator to the second stream operator, an eavesdropper may try and intercept the transmitted tuples and either change what is transmitted or listen to what is being transmitted. Accordingly, an encrypted connection may be established (e.g., SSL) between the first and second stream operator such that no eavesdropping may occur.

In some embodiments, when the stream operator 602 receives the stream of tuples the stream operator 602 may have identified an encryption policy that includes one or more rules for encrypting at least one or more values of the stream of tuples. For example, the stream manager 134 of FIG. 1 may generate an encryption policy (or receive a user request to implement an encryption policy) and accordingly communicate each rule associated with the encryption policy to the node 110A. The encryption policy may specify that all of the "Data X" attribute values of each stream of tuples should be encrypted, but none of the "Tuple Size" attribute values of the stream of tuples should be encrypted. An "attribute" as described herein identifies, categorizes, and describes a particular column to which a set of values from a set of tuples belong to (e.g., name, date, time, etc.).

In some embodiments, in response to determining a particular rule for an encryption policy, a window 612 may be established. A "windowing condition" as described herein, is a logical grouping of tuples by a window based on one or more criteria, such as, but not limited to the encryption policy, count, time, and/or delta. Delta refers to the difference in value of a given attribute between the oldest and the newest tuple in the window. In various embodiments, a window may be a tumbling or sliding window. As understood by one of skill in the art, a tumbling window is processed and emptied when the grouping condition is met, whereas in a sliding window the condition where tuples are removed from the window is defined separately from the condition triggering the operation on the tuples in the sliding window. A window may allow for the storage and/or creation of subsets or groups of tuples, and may be used to establish a set of rules that apply to the subsets or groups of tuples.

In an example illustration, the window 612 may first group the values of the stream of tuples that will not be encrypted, according to the encryption policy, such that the output port 614 may transmit the encrypted values first to the input port 630 via the encrypted connection 610. In order to group the values of the stream of tuples that will not be encrypted, the grouping stream operator may first have to extract the values from their respective tuples and group the values. For example, using the illustration above, if the encryption policy required that all "Data X" attribute values were to be encrypted for each tuple, but all "Tuple Size" attribute values were to not be encrypted, then the window 612 may first extract and group each of the "Tuple Size" values first. The stream operator 602 and stream operator 626 may then establish the encrypted connection 610 (e.g., SSL connection), as described in more detail below. Accordingly, the output port 614 may then extract and transmit each of the "Data X" attribute values of the stream of tuples to the input port 630 via the encrypted connection 610. When a window condition is met, such as all of the encrypted "Data X" values have been transmitted for a given set of tuple or after a particular quantity of time, the window 612 may be released such that the "Tuple Size" values may then be transmitted from the output 614 to the input port 630 via the non-encrypted connection 608. In some embodiments, the stream operators 602 and/or 604 may include more input and/or output ports than illustrated for transmitting and receiving tuples or values in various manners. For example, the stream operator 602 may include the output port 614 for use in transmitting values via the non-encryption connection 608. However, the stream operator 602 may also include a second output port for use in transmitting values via the encrypted connection 610. The stream operator 626 may also include more respective input and output ports.

FIG. 5B illustrates a table 616, which may correspond to the stream of tuples as they appear as soon as they are received and assembled by the processing element PE4 from the processing element PE2, according to embodiments. For example, using the illustration above, FIG. 5B may represent assembled or joined values of the tuples after they arrive at input port 630 via the encrypted connection 610 and non-encrypted connection 608, as specified in FIG. 5A. The table 616 may include the attributes of "tuple ID," which may identify a particular tuple (i.e., row of data), "Data X," which may be any set of data, and "Tuple Size," which may correspond to metadata information about how large a particular tuple is. The attributes (i.e., columns) of "Tuple Size" and "Tuple Size" may not be proprietary or important and therefore require no encryption according to an encryption policy. Alternatively, each of the values within the "Data X" attribute may be proprietary and therefore require encryption according to an encryption policy. The table 616 is illustrative only and may include more attributes or tuples than shown.

For tuple ID 1, the Data X value may be "104DM7MJ2," which may be an encrypted value according to the encryption policy. However, the "Tuple Size" value may be "4k," which may not be encrypted according to the encryption policy. The encryption policy, in this example, may be the same for Tuple ID 2 and 3 also. In an example illustration, because the encryption policy requires that each value of the "Data X" attribute for each tuple (1, 2, and 3) should be encrypted, the stream operator 602 may first extract the "Data X" values from each of the tuples, and the window 612 may then group the rest of the unencrypted values (i.e., 1, 2, 3, 4k, 2k, and 6k) corresponding to the attributes of tuple ID and Tuple Size. The stream operator's 602 associated key may then encrypt each of the "Data X" values (e.g., 104DM7MJ2 for tuple 1) by transmitting the "Data X" values in a single packet (i.e., group or unit) to the input port 630 of the stream operator 626 via the encrypted connection 610.

In some embodiments, after the compute node 110B has received the transmitted values or packet of values from the stream operator 602, then the values may be organized in their respective tuples (e.g., for tuple 1 in table 616, associating the Data X encrypted value of "104DM7MJ2" and the "4k" value with the tuple 1) before being transmitted through the output port 632. For example, if the stream operator 626 first receives a set of encrypted values via the encrypted connection 610, the window 640 may group each of the set of encrypted values for a particular quantity of time such that the set of encrypted values are not passed through the output port 632. Further, a set of non-encrypted values may be transmitted to the stream operator 626 via the non-encrypted connection 608 after the set of encrypted values are transmitted. Because the set of encrypted values may already be grouped at the window 640 when the stream operator receives the non-encrypted values, the stream operator may then re-assemble the values in their respective tuples in preparation to process and transmit the stream of tuples through the output port. In these embodiments, the compute node 110B may include a security key to decrypt the encrypted values (e.g., Data X values) and once the stream of tuples are re-assembled, the stream operator 626 may transmit the stream of tuples without any of the tuples being encrypted. The re-assembling of values within their tuples may occur in any suitable manner. For example, values of particular tuples may be transmitted from output port 614 to input port 630 via a Transfer Control Protocol/Internet Protocol (TCP/IP). Accordingly, the values of tuples may be sent in packets and each packet may include a header and the particular data values. The header may include metadata concerning the particular packet, which may include an identification of the tuples (e.g., tuple ID) that each value belongs to. Therefore, when the stream operator 626 receives values of tuples, the stream operator 626 (or other portion of the associated compute node) may determine which tuples' particular values belong to and assemble the tuples.

In an alternative embodiment, an encryption policy may change for a stream of tuples transmitting between the stream operator 626 and another stream operator within the same compute node 110B. In these embodiments, when each of the tuples are re-assembled within compute node 110B, the compute node 110B may decrypt the encrypted values corresponding to an old encryption policy and encrypt a new set of values corresponding to a new encryption policy via one or more security keys. In yet other embodiments, the encryption policy may not change at all from stream operator to stream operator. In these embodiments, a windowing condition may not be utilized (e.g., window 612 and/or window 640). In an example illustration, the stream operator 602 may first transmit a first set of encrypted values to the stream operator 626 via the encrypted connection 610. If an encryption policy includes a rule that the first set of encrypted data values should remain encrypted when transmitted from the stream operator 626 to a second stream operator within the same node 110B, then the first set of encrypted data values may continue to be transmitted through the output port 632 and to another input port of the second stream operator via another encrypted connection. This process may continue until and if the encryption policy changes for a particular set of stream operators.

Figure 6:
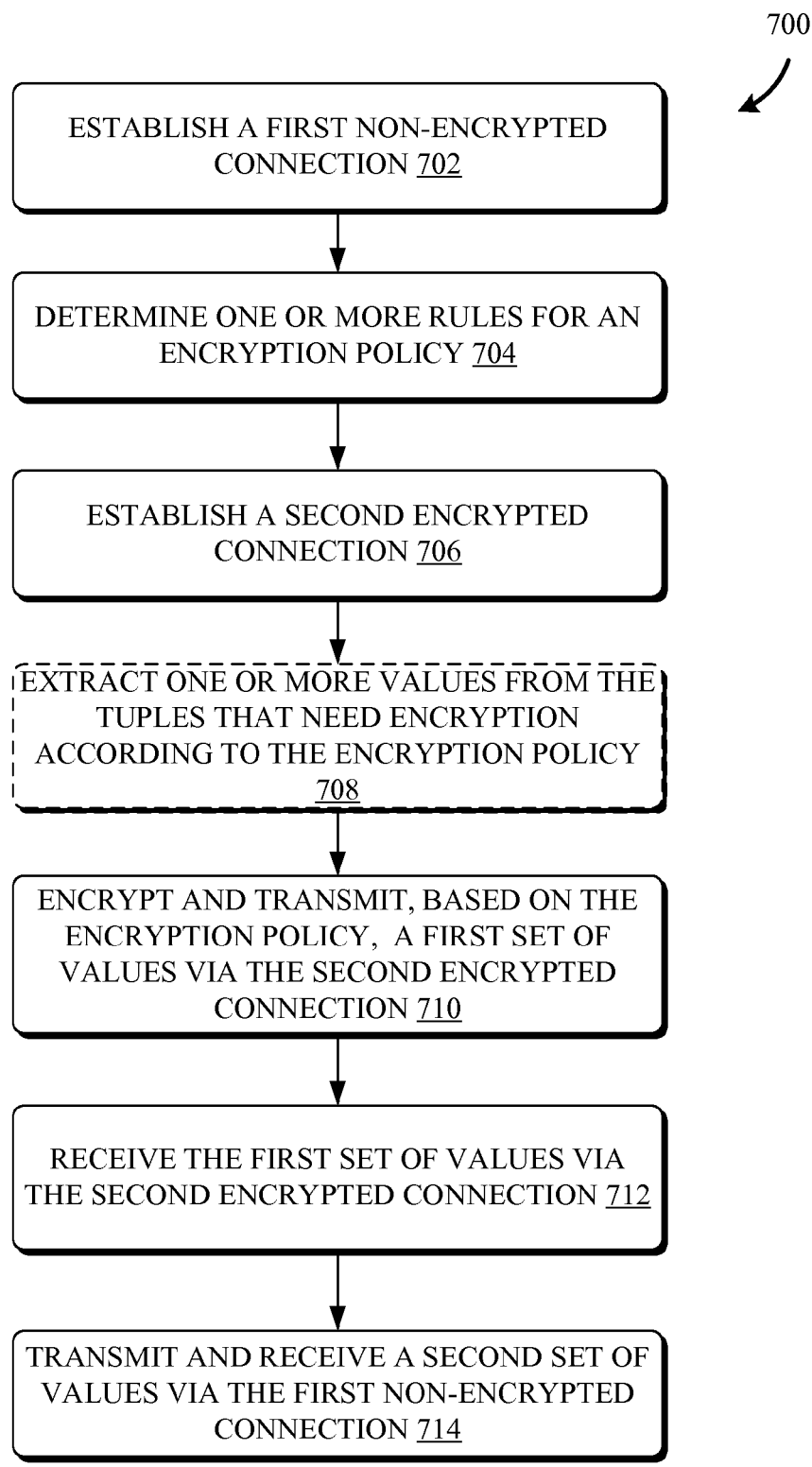
FIG. 6 is a flow diagram of an example process for identifying an encryption policy, transmitting, and receiving at least a portion of tuples according to the encryption policy, consistent with embodiments.

FIG. 6 is a flow diagram of an example process 700 for identifying an encryption policy, transmitting, and receiving at least a portion of tuples according to the encryption policy, consistent with embodiments. It is to be understood that the order in which the blocks described below are discussed is not to be construed as limiting the order in which the individual acts may be performed. In particular, the acts performed may be performed simultaneously or in a different order than that discussed.

In some embodiments, the process 700 may begin at block 702 when a first pair of stream operators establish a first non-encrypted connection for use in transmitting and receiving non-encrypted data. In some embodiments, block 702 may not be performed such that all tuple data transmitted and received by stream operators are encrypted (e.g., via the encrypted connection per block 706). In an example illustration of block 702, at the TCP level of a TCP/IP stack, the two stream operators may establish a TCP connection. This may occur by a handshaking process (e.g., three-way handshake). Specifically, a first stream operator may send a TCP synchronize (SYN) packet to a second stream operator. The second stream operator may then send a synchronize-acknowledgment (SYN-ACK) to the first stream operator. The first stream operator may then send and acknowledge (ACK) message back to the second stream operator. Consequently, a TCP socket connection may be established to start a session between the first stream operator and the second stream operator. Block 702 may be followed by a plurality of processing elements that receive a stream of tuples to be processed, wherein the first and second stream operators are within the plurality of processing elements.

Per block 704, a stream operator (or associated compute node) may determine one or more rules for an encryption policy. The encryption policy may be any suitable encryption policy for encrypting at least a portion of particular tuples. A first rule of encryption policy may require encryption of a first set of values while a second rule of the encryption policy may permit a second set of values to be transmitted without encryption. For example, the first operator may determine that a first rule of the encryption policy requires that every value for a first set of attributes of a first set (e.g., all) of tuples will be encrypted (e.g., FIGS. 5A and 5B above). In these embodiments each of the first set of attributes and each value that corresponds to the first set of attributes of the first set of tuples may be encrypted, while a second set of attributes and their associated values may remain unencrypted for transmitting data from stream operator to stream operator. For example, referring back to FIG. 5B, the encryption policy may require that each value of the tuples' (Tuples 1, 2, and 3) shared attribute of "Data X" should be encrypted. However, the encryption policy may require any values for the attributes of "tuple ID" or "Tuple Size" to not be encrypted. Various types of encryption policies are described in more detail below. In some embodiments, a stream computing component (e.g., stream manager 134 of FIG. 1) may generate the encryption policy and all of its rules based on an event that triggers one or more rules (e.g., time of day, a particular date, a particular application type, a particular user, etc. as discussed in more detail below). In some embodiments, a user may issue an encryption policy request and the stream computing component (e.g., stream manager 134) may implement the encryption policy based on the request.

Per block 706, an encrypted connection may be established between a first stream operator and a second stream operator. Encryption is the process of converting ordinary text (i.e., plaintext), into a form that is unreadable (i.e., ciphertext). Decryption reverses the encryption process by translating ciphertext into plaintext. A cipher is an algorithm used to perform a particular type of encryption and decryption. A security key (e.g., public or private key) may be a set of particular parameters that guide the algorithm and encrypt or decrypts data. The encrypted connection may be any encrypted connection type according to various encryption engine algorithms and keying systems (e.g., Secure Sockets Layer (SSL), Transport Layer Security (TLS), Secure Hypertext Transfer Protocol, etc.). For example, the encrypted connection may be a SSL connection. Referring back to FIG. 5A, for example, the compute node 110A may connect to the compute node 110B (e.g., via a TCP/IP connection). The compute node 110A may further request that the compute node 110B identify itself. Consequently, the compute node 110B may identify itself by transmitting a copy of its SSL security certificate, including the compute node 110B's public key. Compute node 110A may then check the certificate against a list of trusted certificate authorities (CAs). The compute node 110A may further check that the certificate is unexpired, unrevoked, and valid. If the compute node 110B meets the criteria for a valid certificate, the compute node 110A may generate, encrypt, and transmit a symmetric session key to node 110B using compute node 110B's public key. The compute node 110B may then decrypt the session key using its own private key and may transmit back an acknowledgement to compute node 110A encrypted with the session key to start an encrypted session. Accordingly, the compute nodes 110A and 110B may then encrypt and decrypt any portion of the data tuples that are sent (blocks 710, 712, and 714).

Per block 708, in some embodiments, the first stream operator may then extract (i.e., remove) one or more values from the tuples that need encryption according to the encryption policy. Extracting may occur because only particular values of tuples may require encryption according to an encryption policy and at least two different connections may be needed to transmit tuples (e.g., the first non-encrypted connection and the second encrypted connection). Accordingly, for example, if a tuple included one first value that needed encryption and a second value that did not need encryption, then the first value may have to be extracted from the tuple to transmit via the encrypted connection, whereas the second value may have to be transmitted via a non-encrypted connection. In other embodiments, however, extracting per block 708 may not need to occur when the encryption policy requires that a particular subset of tuples and all of the subset's corresponding values need encryption. In these embodiments, because each value of a particular tuple may need encryption only one connection may need to be utilized for particular tuples and therefore the particular tuple may not require extraction of any values. For example, if the first operator received 10 tuples and only 5 tuples needed encryption, the first operator may identify the 5 tuples that need encryption and transmit the 5 tuples via the second encrypted connection and transmit the other 5 tuples that do not require encryption via the first non-encrypted connection. In some embodiments, instead of or in addition to the first operator extracting the one or more values from the tuples that need encryption, the first operator may extract one or more values from the tuples that do not need encryption. For example, referring back to FIG. 5A, the operator 602 may first identify a first value of a first tuple that does not need encryption. The operator 602 may then extract the first value from the first tuple and then group the first value in the window 612. The operator 602 may then identify a second value of the first tuple that needs encryption. The operator may then transmit the second value via the encrypted connection and then transmit the first value via the non-encrypted connection.

Per block 710, after an encrypted connection has been established, a first security key located on a compute node may encrypt, based on the encryption policy, at least a first set of values of a set of tuples. The associated (first) stream operator may then transmit the first set of values and another receiving (second) stream operator may receive the first set of values via the second encrypted connection (block 712). In some embodiments, the second stream operator is located on an a different compute node than the first stream operator and the compute node's security key that is associated with the second stream operator may decrypt, based on the encryption policy, the first portion of the first set of tuples received via the encrypted connection. For example, if the encryption policy specified that every tuple needed to have its attribute A value encrypted, then the first compute node may encrypt a first quantity of attribute A values of a stream of tuples and transmit (e.g., via the first stream operator and encrypted connection) the first quantity to a second node (corresponding to a second stream operator). The second node may then decrypt, upon arrival, all of the first quantity for communicating with other processing elements or stream operators within the second node.

Various security keying systems and/or ciphertext encryption algorithms may be utilized in several embodiments associated with block 710. For example, the encryption algorithm may be an asymmetric algorithm type, such as a Ribest- Shamir-Adleman (RSA), Diffie-Hellman (DH), Pretty Good Privacy (PGP) or other algorithms. The asymmetric algorithm may be utilized with asymmetric security keys. Asymmetric security keys may include private and public keys. Alternatively, the algorithm type may be a symmetric algorithm that is meant to be utilized with a symmetric security key. The symmetric algorithm may be any number of algorithms such as triple Data Encryption Standard (DES), International Data Encryption Algorithm (IDEA), Advanced Encryption Standard (AES), or other algorithms. For a symmetric security key algorithm, only one key is utilized to encrypt and decrypt tuple data.

In an embodiment, a public key infrastructure ("PKI") may be utilized to create, organize, store, distribute and maintain public keys, which is analogous to an SSL connection. Accordingly, an encryption engine may generate asymmetric algorithms to authenticate a compute node's identity. In this embodiment, a first compute node may send a request to a second compute node for the second compute node's identity. This request may be coupled with a digital certificate that guarantees that the second compute node is an owner of private and/or public keys. A server computing device, such as a certificate authority (CA) server may receive the request and determine whether the digital certificate is valid by checking with a second server computing device, such as a key server, to see if the digital certificate is in the first compute node's list of trusted entities. If the digital certificate is not recognized, the connection may be dropped between the two compute nodes. If the digital certificate is recognized, the PKI authentication system may validate the certificate. If the digital certificate is authorized, an encrypted connection may be established.

In an alternative embodiment, a non-PKI authentication system may be utilized with keys that perform different functions than described above. For example, the compute node 110A may store a private key and accordingly encrypt tuple data before it is transmitted to compute node 110B. The encrypted tuples along with the compute node 110A's private key may be a digital signature. Compute node 110B may then compare the digital signature with the tuple data to verify that there is a match before an encrypted connection is established.

In some embodiments, per block 714, the first and second stream operators may respectively transmit and receive a second set of values of a particular set of tuples via the non-encrypted connection (established at block 702). For example, using the illustration above, after the first quantity of encrypted attribute A values have been transmitted from the first compute node to the second compute node via the encrypted connection, a second set of values may be transmitted from the first compute node to the second compute node via the non-encrypted connection.

It is recognized that any suitable encryption policy may be implemented for embodiments of the present disclosure. Described below are various embodiments of several encryption policies that may include one or more rules. In some embodiments, the encryption policy may include a rule that requires only a particular value of one or more attributes within a set of tuples to be encrypted while the rest of the tuples remain unencrypted. Each of a set of tuples may include a shared attribute. However, a first tuple may not have its value within the shared attribute encrypted, while a second tuple may have its value within the shared attribute not encrypted. For example, referring back to FIG. 5B, for tuple number 1, the value of "4k" for attribute "Tuple Size" may require encryption according to the encryption policy, whereas for the tuple number 2, the value of "2k" may not require encryption according to the encryption policy.

In some embodiments, the encryption policy may include a rule specifying that only a first subset of tuples within stream or portion of tuples is encrypted. Accordingly, a stream of tuples flowing between two stream operators may include a smaller quantity of tuples that are encrypted and the rest of the stream of tuples are not encrypted according to the encryption policy. For example, if a stream of tuples includes 20 tuples, then an encryption policy may include a rule specifying that only 10 tuples (and all of the 10 tuples' associated values) should be encrypted, while the other 10 tuples should not be encrypted.

In some embodiments, the encryption policy may include a rule requiring that a particular set of values of one or more tuples is encrypted only when the particular set of values fall outside of a threshold (i.e., changes above or below a threshold). The threshold may correspond to a value point at which encryption (or decryption) is triggered for a particular set of values according to the encryption policy. The threshold may be any suitable value at which encryption is necessary. For example, a threshold value at which point encryption is needed for any value of a tuple may be 10. Accordingly, if a particular value of a tuple changes from 9 to 10, the encryption policy may cause the value that was unencrypted to now become encrypted because the threshold value of 10 was met. Therefore, in this example, any value equal to or greater than 10 falls outside of a threshold. Conversely, a threshold value may be any value that is below 9. Accordingly, if a value changes from 9 to 8, the value of 8 may be encrypted. Therefore, in this example, any value below 9 may be "outside" of a threshold of 9. In some embodiments, using this example, if the value of 8 changes a second time to 9, the value may not be "outside" of a threshold and therefore the value of 9 may be decrypted.

In some embodiments, the encryption policy may include or be based on any window or windowing condition. For example, as described above, a window according to a windowing condition may group each of the values of tuples that will be encrypted according to the encryption policy. Alternatively, the window may group each of the values of tuples that will not be encrypted according to the encryption policy. In some embodiments, a windowing condition may be for utilizing encrypted and non-encrypted connections and transmitting each value in an organized manner using the appropriate connection type. For example, a time window associated with a time windowing condition may group a set of non-encrypted values for a particular quantity of time (e.g., 5 minutes) at a first stream operator. A set of encrypted values may then be transmitted (via an encrypted connection) at a first time from the first stream operator to a second stream operator. After the particular quantity of time the set of non-encrypted values that were grouped by the time window may then be transmitted at a second time (subsequent to the first time) from the first stream operator to the second stream operator. In another example, a count window might group values that will (or will not) be encrypted to be transmitted after a particular count (e.g., after every fifth value is identified to be encrypted, the stream operator may batch transmit the five values).

In some embodiments, the encryption policy may include a rule to encrypt tuples or values of tuples based on a particular time, such as a particular time of day or night. For example, the encryption policy may include a rule to only encrypt each of a stream of tuples from 6 p.m. on a first day to 5 a.m. the next day. An encryption policy may include a rule to encrypt tuples or values of tuples based on a quantity of minutes (e.g., encrypting for 30 minutes), a calendar date (e.g., encrypt tuples only on August 13$^{th}$), a series of calendar dates, or any other time measurement. In embodiments, the particular time may be based on a time sequence associated with particular streams of tuples. For example, a near real-time video may be streamed and an encryption policy may include a rule to only encrypt a first quantity of tuples that corresponds to a particular time sequence of the video.

In some embodiments, the encryption policy may include a rule to encrypt tuples or values of tuples only when the tuples are associated with (e.g., are a part of) a particular stream computing application type. Particular stream computing application types within a stream computing environment may include sensor monitoring applications, network traffic analysis applications, financial tracking applications, online-auction applications, security threat detection applications, or any other types of suitable applications. A sensor monitoring application may include continually monitoring sensor data from an environment or subject (e.g., gathering near-real time biometric data from a heart rate monitor attached to a person). Network traffic analysis applications may include analyzing network traffic in near real-time. For example, these application may generate statistics and detect critical conditions, such as monitor web logs, detect whether a particular server is appropriately load-balancing client requests, etc. Financial tracking applications may perform near real-time analysis of stock prices, identify financial trends, identify financial correlations, etc. Security threat applications may monitor a computing device in near real-time to determine whether malware has infected the computing device. Therefore, for example, an encryption policy may include a rule to encrypt tuples when the tuples belong to an application that is a part of a security threat application, but not part of a network traffic analysis application.

In some embodiments, the encryption policy may include a rule to encrypt data based on a particular user that accesses a streaming application and when the particular user accesses the streaming application one or more tuples are encrypted. For example, a user may issue a request for financial tracking data. When the user's computing device establishes a connection with a server computing device associated with multiple processing elements and stream operators, the server computing device may obtain an IP address corresponding to the user's computing device. The server computing device may include a data store dedicated for storing particular IP addresses that are subject to an encryption policy. The encryption policy, for example, may include a rule to encrypt each and every tuple between all processing elements for the entire session associated with a particular IP address. In some embodiments, the encryption policy may include a rule to encrypt tuples or values of tuples based on particular sensing data. For example, the encryption policy may include a rule to encrypt tuples only when a sensor monitoring application includes receiving tuples from sensor X (which is located on person Y).

In some embodiments, the encryption policy may be based on encrypting data in conjunction with what else is running and/or who else is accessing data. For example, any tuples on machine B may be encrypted regardless of where it gets sent unless a particular user is the only user accessing the tuples. This may be useful, for example, in a cloud computing environment where multiple jobs may be run and certain resources are dedicated to particular users or applications. For example, a cloud computing environment may be running multiple jobs that are dedicated for a particular user and/or application. If resources are dedicated only for a particular user, encryption may not be needed. However, once a particular machine starts getting shared with other users or applications, encryption may be required.

In some embodiments, the encryption policy may be based on determining that a first stream operator outputs tuples to a second stream operator at a slower rate than a third stream operator outputs the same tuples to a fourth stream operator and encrypting the tuples only between the third operator and fourth stream operator but not between the first and second stream operator. The rate at which an operator outputs tuples make take into account at least two factors. First is the capacity of an operator to process a tuple. Second is the rate at which the operator receives tuples. For example, an operator with a processing capability to process one tuple a second but which only receives one tuple per minute may output one tuple per minute.

This encryption policy may be based on the principle that establishing encrypted connections may take more processing time than establishing non-encrypted connections. Accordingly, if a particular upstream operator or set of operators processes tuples at a faster rate than a downstream operator or set of operators, the encryption policy may be placed at the upstream operators or set of operators in order to not comprise the already-slow processing downstream operators. Moreover, if the upstream operator(s) have to wait anyway to transmit tuples to the downstream operator(s) (because of the slow processing of the downstream operators), then it may not compromise the system to place the encryption policy at the upstream operator(s). In an example illustration, a first stream operator may output one tuple every minute to a second operator. The second stream operator may output one tuple every minute to a third operator. However, the third operator may output one tuple every five minutes to a fourth operator. After determining this output rate, the encryption policy may include a rule to encrypt only the tuples that flow between the first stream operator and second stream operator. In this example, the second operator may have to wait to send tuples to the third operator because of the third operator's slow processing time. The first stream operator and second stream operator may therefore establish an encrypted connection according to the encryption policy, which may take additional processing time. However, because the third stream operator may have to wait anyway to send tuples to the fourth stream operator, establishing the encrypted connection between the first and second stream operator may not compromise the overall flow processing time.

In some embodiments, the encryption policy may be based on whether a sending or receiving stream operator has spare (i.e., additional, unused, unoccupied) processing capacity. "Spare processing capacity" may mean that a particular stream operator has the capacity to perform additional processing than what the stream operator is currently processing. Spare processing capacity may also refer to some amount of time that a processing element or operator may have available and use in place of waiting for a new tuple to process. This may be related to the "output rate" as described above. Determining whether a particular stream operator has spare processing capacity may be based on various factors such as comparing actual output/input rate of the stream operator (e.g., throughput) with bandwidth capacity of the stream operator, job load, processing time, CPU cycles, and/or time of day, etc.

In various embodiments, the encryption policy may be system or user-defined. For example, a user may issue a command to the system (e.g., management system 105 of FIG. 1), which specifies a desired encryption policy for each of the compute nodes to utilize. These encryption policies may be any of the encryption policies discussed above, or any other encryption policy. In another example, the system (e.g., stream manager 134 105 of FIG. 1) may generate or select an encryption policy and distribute the encryption policy to each compute node without a user request.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes"

and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method for implementing an encryption policy in a stream computing environment, comprising:
    receiving a stream of tuples to be processed by a plurality of processing elements operating on one or more computer processors, each processing element having one or more stream operators, the plurality of processing elements forming an operator graph in which the tuples flow between the one or more stream operators, the operator graph defining one or more execution paths for processing and routing the stream of tuples, each processing element having an associated memory space, wherein the plurality of processing elements includes a first processing element having a first stream operator configured to transmit at least a portion of the tuples to a second stream operator;
    determining that a first rule of an encryption policy requires encrypting at least a first value of a first attribute, the first value is within a first tuple of the portion of the tuples, wherein each tuple of the portion of the tuples includes the first attribute and a second attribute;
    establishing a first connection for transmitting from the first stream operator to the second stream operator, wherein the first connection is an encrypted connection; and
    extracting the first value from the first tuple and transmitting the first value to the second stream operator via the first connection, wherein the first stream operator performs the extracting and transmitting.

2. The method of claim 1, further comprising:
    determining that a second rule of the encryption policy permits at least a second value of the second attribute to be transmitted from the first to the second operator without encryption, wherein the second value is within the first tuple of the portion of the tuples;
    establishing a second connection between the first stream operator and the second stream operator, wherein the second connection is a non-encrypted connection; and
    extracting the second value from the first tuple of the portion of the tuples and transmitting the second value to the second stream operator via the second connection, wherein the first stream operator performs the extracting and transmitting.

3. The method of claim 2, wherein the encryption policy includes a time windowing condition, and wherein the first stream operator groups at least the second value for a particular quantity of time prior to the transmitting the second value, and wherein the transmitting the first value occurs at a first time, and wherein after the particular quantity of time, the transmitting the second value occurs at a second time subsequent to the first time.

4. The method of claim 1, further comprising extracting a second value of the first attribute from a second tuple of the portion of the tuples and transmitting the first value and the second value in a single packet to the second stream operator via the first connection, wherein the first stream operator performs the extracting and transmitting.

5. The method of claim 1, wherein the first rule of the encryption policy permits the portion of tuples, except for the first value of the first tuple, to remain unencrypted when transmitted from the first stream operator to the second stream operator.

6. The method of claim 1, wherein the determining that a first rule of an encryption policy requires encrypting is based on determining that the first value changes outside of a threshold, and wherein after the first value changes outside of the threshold the first value requires the encrypting.

7. The method of claim 1, wherein the plurality of processing elements further includes a third stream operator configured to receive the portion of tuples from the second stream operator and a fourth stream operator configured to receive the portion of tuples from the third stream operator, the method further comprising:
    determining that the third stream operator outputs the portion of tuples to the fourth stream operator at a slower rate than the first stream operator outputs the portion of tuples to the second stream operator; and
    in response to the determining, generating a second rule of the encryption policy that requires encrypting the portion of the tuples only between the first stream operator and the second stream operator, but not encrypting the portion of the tuples between the third stream operator and the fourth stream operator.

8. A system for implementing an encryption policy in a stream computing environment, the system comprising:
- a computing device having a processor; and
- a computer readable storage medium having program instructions embodied therewith, the program instructions executable by the processor to cause the system to:
  - receive a stream of tuples to be processed by a plurality of processing elements operating on one or more computer processors, each processing element having one or more stream operators, the plurality of processing elements forming an operator graph in which the tuples flow between the one or more stream operators, the operator graph defining one or more execution paths for processing and routing the stream of tuples, each processing element having an associated memory space, wherein the plurality of processing elements includes a first processing element having a first stream operator configured to transmit at least a portion of the tuples to a second stream operator;
  - determine that a first rule of an encryption policy requires encrypting at least a first value of a first attribute, the first value is within a first tuple of the portion of the tuples, wherein each tuple of the portion of the tuples includes the first attribute and a second attribute;
  - establish a first connection for transmitting from the first stream operator to the second stream operator, wherein the first connection is an encrypted connection; and
  - extract the first value from the first tuple and transmit the first value to the second stream operator via the first connection, wherein the first stream operator performs the extracting and transmitting.

9. The system of claim 8, wherein the program instructions executable by the processor further cause the system to determine that a second rule of the encryption policy requires only a first subset of tuples within the portion of tuples to be encrypted, the first subset including the first value.

10. The system of claim 8, wherein the program instructions executable by the processor further cause the system to determine that a second rule of the encryption policy requires encrypting the portion of the tuples only when the portion of the tuples are associated with a particular stream computing application type, and wherein the first tuple is associated with the particular stream computing application type.

11. The system of claim 8, wherein the program instructions executable by the processor further cause the system to:
- determine that a second rule of the encryption policy permits at least a second value of the second attribute to be transmitted from the first to the second operator without encryption, wherein the second value is within the first tuple of the portion of the tuples;
- establish a second connection between the first stream operator and the second stream operator, wherein the second connection is a non-encrypted connection; and
- extract the second value from the first tuple of the portion of the tuples and transmit the second value to the second stream operator via the second connection, wherein the first stream operator performs the extracting and transmitting.

12. The system of claim 11, wherein the encryption policy includes at least a tumbling windowing condition, wherein the first operator groups the second value prior to the transmit the second value, and wherein the transmit of the first value occurs at a first time from the first stream operator to the second stream operator, and according to the tumbling windowing condition, the transmit of the second value occurs at a second time subsequent to the first time from the first stream operator to the second stream operator.

13. The system of claim 8, wherein the plurality of processing elements further include a third stream operator configured to receive the portion of tuples from the second stream operator and a fourth stream operator configured to receive the portion of tuples from the third stream operator, and wherein the program instructions executable by the processor further cause the system to:
- determine that the third stream operator outputs the portion of tuples to the fourth stream operator at a slower rate than the first stream operator outputs the portion of tuples to the second stream operator; and
- in response to the determine, identify a second rule of the encryption policy that requires encrypting the portion of the tuples only between the first stream operator and the second stream operator, but not encrypting the portion of the tuples between the third stream operator and the fourth stream operator.

14. The system of claim 8, wherein the program instructions executable by the processor further cause the system to determine that a second rule of the encryption policy requires encrypting the portion of the tuples based on a particular time of day or night.

15. A computer program product comprising a computer readable storage medium having program instructions embodied therewith, the program instructions executable by a computing device to cause the computing device to perform a method, the method comprising:
- receiving a stream of tuples to be processed by a plurality of processing elements operating on one or more computer processors, each processing element having one or more stream operators, the plurality of processing elements forming an operator graph in which the tuples flow between the one or more stream operators, the operator graph defining one or more execution paths for processing and routing the stream of tuples, each processing element having an associated memory space, wherein the plurality of processing elements includes a first processing element having a first stream operator configured to transmit at least a portion of the tuples to a second stream operator;
- determining that a first rule of an encryption policy requires encrypting a first set tuples of the portion of tuples and determining that the first rule further requires a second set of tuples of the portion of tuples to be unencrypted;
- establishing a first connection for transmitting from the first stream operator to the second stream operator, wherein the first connection is an encrypted connection; and
- transmitting the first set of tuples to the second stream operator via the first connection, wherein the first stream operator performs the transmitting.

16. The computer program product of claim 15, wherein the method further comprises determining that a second rule of the encryption policy requires encrypting one or more of the portion of tuples based on a particular user that accesses a streaming application.

17. The computer program product of claim 15, wherein the encryption policy includes at least a time windowing condition and the first stream operator groups tuples of the portion of the tuples received by the first stream operator during a particular time period according to the time windowing condition, the method further comprising:
- extracting a particular value from each tuple of the portion of the tuples received by the first stream operator during the particular time period; and transmitting the particular value of the tuples received by the first stream operator during the particular time period in a single packet to the second stream operator via the first connection, wherein the first stream operator performs the extracting and transmitting.

18. The computer program product of claim 15, wherein the method further comprises:
establishing a second connection between the first stream operator and the second stream operator, wherein the second connection is a non-encrypted connection; and
transmitting the second set of tuples to the second stream operator via the second connection, wherein the first stream operator performs the transmitting the second set of tuples.

19. The computer program product of claim 15, wherein the plurality of processing elements further include a third stream operator configured to receive the portion of tuples and a fourth stream operator configured to receive the portion of tuples from the third stream operator, and wherein the encryption policy includes a second rule requiring encryption of the portion of the tuples transmitted from the third to the fourth stream operator when at least one of a sending or receiving stream operator has spare processing capacity, the method further comprising:
determining that the third stream operator has spare processing capacity; and
in response to the determining that the third stream operator has spare processing capacity, establishing a second connection for transmitting from the third stream operator to the fourth stream operator, wherein the second connection is an encrypted connection; and
transmitting the portion of tuples to the fourth stream operator via the second connection, wherein the third stream operator performs the transmitting.

20. The computer program product of claim 15, wherein the method further comprises determining that a second rule of the encryption policy requires encrypting the portion of the tuples based on a particular calendar date.

\* \* \* \* \*